United States Patent [19]

Miller

[11] Patent Number: 5,238,738
[45] Date of Patent: Aug. 24, 1993

[54] POLYMERIC MINUS FILTER
[75] Inventor: Robert H. Miller, Santa Rosa, Calif.
[73] Assignee: Minnesota Mining and Manufacturing Company, St. Paul, Minn.
[21] Appl. No.: 784,367
[22] Filed: Oct. 29, 1991
[51] Int. Cl.$^5$ .............. B32B 27/36; B05D 5/06; G02B 5/22
[52] U.S. Cl. .................... 428/333; 428/412; 428/419; 428/447; 428/461; 428/516; 428/521; 428/522; 428/913; 427/10; 427/162; 427/164; 359/359; 359/589
[58] Field of Search .............. 428/516, 461, 412, 419, 428/447, 521, 522, 333, 913; 427/10, 162, 164; 350/1.6, 166

[56] References Cited

U.S. PATENT DOCUMENTS

| 4,106,857 | 8/1978 | Snitzer | 350/311 |
|---|---|---|---|
| 4,837,044 | 6/1989 | Murarka et al. | 427/10 |
| 4,896,928 | 1/1990 | Perilloux et al. | 350/1.6 |
| 4,915,476 | 4/1990 | Hall et al. | 350/163 |
| 4,935,166 | 6/1990 | Lee et al. | 252/582 |

OTHER PUBLICATIONS

Herman V. Boeing, "Fundamentals of Plasma Chemistry and Technology," Technomic Publishing Co., Inc., Lancaster, Pa., 327-332 (1988).
J. J. Beulens et al., Journal of Applied Polymer Science: Applied Polymer Symposium 46 91-108, 209-242, 527-540 (1990).

Primary Examiner—P. C. Sluby
Attorney, Agent, or Firm—Gary L. Griswold; Walter N. Kirn; Lorraine R. Sherman

[57] ABSTRACT

A polymeric minus filter for an incident electromagnetic spectral band comprises at least one polymeric interference stack tuned to a predetermined design wavelength centered around $\lambda_0$, wherein $\lambda_0$ is in the range of 300 nm to 2000 nm, said filter comprises an optically transparent substrate and having deposited thereon at ambient temperatures (20° to 23° C.) a multiplicity of pairs of polymeric thin interference layers plus one final polymeric layer having index of refraction $n_2$, each pair of interference layers having a total optical thickness equal to ½ wavelength of $\lambda_0$, the members of each pair having refractive indices $n_1$ and $n_2$, respectively, wherein the layer having refractive index $n_2$ is directly superimposed upon said substrate having refractive index $n_s$ and wherein $n_s$ is approximately equal to $n_1$, and wherein $n_2 < n_1$.

20 Claims, 3 Drawing Sheets

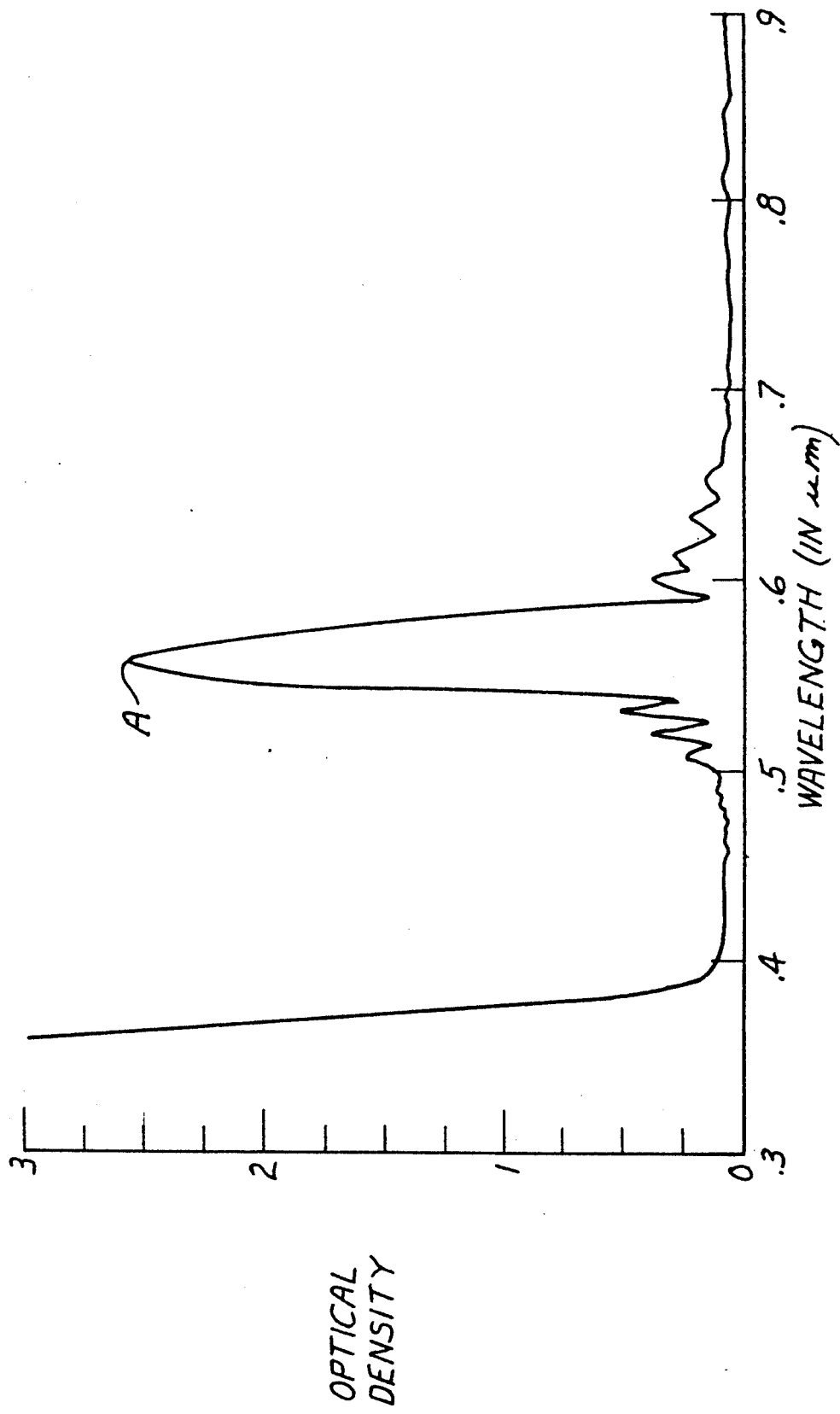

POLYMERIC MINUS FILTER

The United States government has certain rights in this invention pursuant to Contract No. F33615-18-C-5446 awarded by the United States Air Force Office Systems Command, Aeronautical Systems Division, PMRRA, Wright-Patterson Air Force Base.

TECHNOLOGICAL FIELD

This invention relates to a polymeric minus filter for reflecting monochromatic unwanted electromagnetic energy. In another aspect, it relates to a method for providing the minus filters of the invention. The minus filters are useful to provide sensor protection including eye protective devices.

BACKGROUND ART

It is known in the art that unwanted electromagnetic radiation can be absorbed by organic dyes or by inorganic colorants impregnated in a substrate material. U.S. Pat. Nos. 4,935,166 and 4,106,857 disclose absorption filters utilizing organic dyes and inorganic colorants, respectively. The principal disadvantage of the dye approach is that peaks of maximum absorption cannot be tuned to coincide exactly with emission wavelengths of the unwanted monochromatic radiation. The spectral distributions of absorbing visible colorants are generally slowly varying with wavelength and tend to lack the sharp cuton and cutoff profiles that are essential for obtaining high photopic efficiency. Absorption filters utilizing organic dyes cannot be design engineered to operate at any selected wavelength to provide a high degree of optical density, and they have not generally provided narrow rejection bands for unwanted radiation sources. As a result of these factors, the visual photopic transmittance response of dye based laser rejection filters must be sacrificed in order to achieve high optical densities required to absorb unwanted radiation and provide eye protection. It should also be noted that the radiation absorbed by a dye material is usually dissipated in the form of heat or fluorescence or by photochemical reactions within the material. Under some circumstances of exposure to high energy radiation, this can lead to damage of the dye material which no longer shields the user from the potentially hazardous optical radiation sources.

Rugate filters are disclosed in U.S. Pat. Nos. 4,837,044, and 4,915,476. These filters use graded (inhomogeneous) multilayers of dielectric thin film materials, typically mixtures of inorganic silicon dioxidesilicon nitride ($SiO_2$—$Si_3N_4$), mixed zinc sulfide-selenide, or aluminum arsenide/gallium arsenide on an optically transparent support. However, these types of filters have proven difficult to manufacture outside of the laboratory.

Certain minus filters are known in the art. U.S. Pat. No. 4,896,928 discloses multilayers of homogeneous inorganic oxides in thin film structures on an optically transparent or partially absorbing support. Typically such filters are not efficient in providing ultra narrow reflection bandwidths for the rejection of unwanted electromagnetic radiation.

Plasma polymerization of certain polymeric materials including hexamethyl disiloxane, structure, properties, and variation of refractive indices with deposition conductions are disclosed in Herman V. Boeing, "Fundamentals of Plasma Chemistry and Technology", Technomic Publishing Co., Inc., Lancaster, Pa., 327-332 (1988); J. J. Beulens et al., Journal of Applied Polymer Science:Applied Polymer Symposium 46 91-108, 209-242, 527-540 (1990).

SUMMARY OF THE INVENTION

Briefly, the present invention provides an organic minus filter for an incident electromagnetic spectral band comprising at least one interference stack tuned to a predetermined design wavelength centered around $\lambda_0$, wherein $\lambda_0$ is in the range of 300 nm to 2000 nm, the filter comprising an optically transparent or partially absorbing substrate and having deposited thereon a multiplicity of pairs (plus one final quarter wave optical thickness low refractive index ($n_2$) layer) of homogeneous polymeric thin interference layers, each pair of interference layers having a total optical thickness equal to ½ of the wavelength at $\lambda_0$, the members of each pair having refractive indices $n_1$ and $n_2$, respectively, wherein the layer having refractive index $n_2$ is directly superimposed upon the substrate having refractive index $n_s$ and wherein ns is approximately equal to $n_1$, and wherein $n_2$ is less than $n_1$.

In another aspect, there is provided a polymeric minus filter comprising multiple stacks for rejecting a multiplicity of unwanted electromagnetic radiation bands, each stack interleaved between a relatively thick layer of optically transparent or partially absorbing substrate.

In a further aspect, a method for providing interference stacks of polymeric layers, is described. The method involves providing a stack of multiple pairs of polymeric thin interference layers plus one low refractive index ($n_2$) polymeric layer, each pair having two layers of different refractive indices, one layer of which has a refractive index essentially the same as that of the supporting optically transparent substrate. A preferred method of providing the polymer pairs is vacuum deposition by plasma polymerization.

The minus filter of the present invention has been found to have superior low stress characteristics when deposited on plastic substrates such as polycarbonate or polystyrene. The stacks of polymeric layers also show superior adhesion characteristics when deposited on commonly used optically transparent polymeric supports such as the aforementioned polycarbonate or polystyrene substrates. The stacks are characterized by low defect levels (e.g., pinholes) and can be deposited conformably on nonlinear substrates. The minus filters have high photopic transmittance as well as neutral color balance. They are also readily produced, provide eye protective devices having useful field of vision and sharp band edges.

In this application:

"essentially the same refractive index" means does not vary more than 0.05 in refractive index;

"stack" means sufficient pairs of polymeric thin interference layers plus one final low refractive index layer on at least one substrate to provide a desired level of optical density for rejection of unwanted radiation; generally stacks have in the range 25 to 2500 pairs, preferably in the range of 25 to 500 pairs, and more preferably in the range of 50 to 150 pairs;

"low refractive index layer" means a polymeric layer having refractive index $n_2$;

"thin interference film" means two layers wherein the distance between interfaces are small so that multiplyreflected beams of transmitted wavelengths of light are coherent with one another;

"optical thickness" means the product of the refractive index and the physical thickness of a thin film interference layer;

"minus filter" means at least one stack of thin interference film layers on a support which provides rejection of a predetermined narrow band of electromagnetic radiation.

BRIEF DESCRIPTION OF THE DRAWING

FIG. 4 is a spectral performance curve of the 121 layer minus filter of Example 1.

DETAILED DESCRIPTION OF PREFERRED EMBODIMENTS

Figure 1:
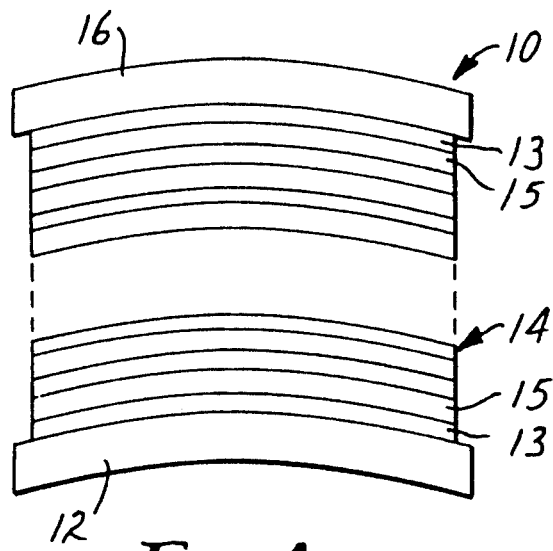
FIG. 1 is a schematic view showing a polymeric minus filter stack, the stack containing a polymeric substrate and having thereon multiple pairs of polymeric thin interference layers plus one low refractive index layer, and the composite being protective medium through which incident radiation passes.

The present invention is particularly useful for providing multilayer minus filters, each minus filter being capable of eliminating at least one narrow wavelength band from a spectrum of incident electromagnetic radiation. Such filters are particularly useful for eliminating intense laser radiation which can be damaging to the human eye.

One embodiment of a minus filter design comprises a stack of all quarter-wave optical thickness films composed of two alternating layers of materials (plus one final quarter wave optical thickness low refractive index layer), one of which has the same refractive index as the substrate and the incident medium (i.e., typically polycarbonate plastic and an index matching optical cement). The number of pairs, N, of quarter-wave optical thickness layers in the minus filter determines the degree of optical density achievable at a specific threat or rejection wavelength and can be computed from the following formula:

$$N = INT\left[\frac{\log\left[\left(\frac{1+R}{1-R}\right) + \sqrt{\left(\frac{1+R}{1-R}\right)^2 - 1}\right]}{2\log\left(\frac{n_1}{n_2}\right)}\right]$$

wherein
$R = 1 - 10^{-D}$,

D is the optical density required at the threat or rejection wavelength;

$n_1$ and $n_2$ are the refractive indices of the two layers of materials such that $n_1/n_2 > 1$; one of the layers, i.e., that having refractive index $n_1$, equals or approximately equals the refractive index of the substrate; and "INT" is a function which returns the greatest integer which is less than or equal to the expression in brackets.

Tunability is achieved by making the optical thickness of each layer of the minus filter equal to a quarter-wave at the desired laser rejection wavelength. The bandwidth $\Delta\lambda$ of the laser rejection zone is proportional to the ratio of the refractive indices of the high index film material to the low index film material; it is computed from the following formula:

$$\Delta\lambda = \lambda_{0m}\left[\frac{1}{1 - \left(\frac{2}{\pi m}\right)\sin^{-1}\left|\frac{\frac{n_1}{n_2} - 1}{\frac{n_1}{n_2} + 1}\right|} - \frac{1}{1 + \left(\frac{2}{\pi m}\right)\sin^{-1}\left|\frac{\frac{n_1}{n_2} - 1}{\frac{n_1}{n_2} + 1}\right|}\right]$$

where $n_1$ and $n_2$ are the refractive indices of the film materials as defined above; m is the order of the reflectance band (i.e., 1, 3, 5, ... m), and $\lambda_{0m}$ is the wavelength at the center of the m'th order reflectance band, wherein $\lambda_{0m} = \lambda_0/m$ and $\lambda_0$ is as previously defined.

Out-of-band ripple for minus filter is minimized by keeping the refractive indices of the two film materials of a pair fairly closely matched (i.e., $\Delta n$ is approximately within the range of greater than zero and up to 0.1) as well as through the optimal use of matching layers using wellestablished design techniques disclosed, for example, in the references Alfred Thelen, "Design of Optical Interference Coatings", McGraw-Hill Book Co., 1989; and H. A. Macleod, "Thin Film Optical Filters", Macmillan, 1986.

Representative polymeric substrates for a multilayer stack (minus filter) include polycarbonate having refractive index 1.58-1.59 (available from General Electric Co.), polystyrene having index of refraction 1.56-1.60, Lustrex TM (Monsanto), Plexiglas TM polyacrylates (e.g., manufactured by Rohm and Hass [index of refraction (sodium D wavelength) = 1.46-1.52], Ardel TM polyaryl sulfone (e.g., manufactured by Union Carbide) index of refraction = 1.67, Volox TM polyesters (e.g., manufactured by General Electric) index of refraction = 1.52-1.57, Udel TM polysulfone (e.g., manufactured by Union Carbide) index of refraction = 1.63-1.64, and polymethyl methacrylate, index of refraction = 1.49. Each stack has one polymeric substrate and optionally it can have a transparent upper protective medium. Multistacks can comprise relatively massive interleaved transparent polymeric substrates, each stack being deposited on its own substrate and the multistack optionally having a protective, transparent upper layer or upper substrate. In any composite of multistacks it is preferred to have all substrates of the same polymeric material and same optical properties. If an adhesive is used (as between substrate and a layer of a pair) its optical properties (e.g., refractive index and range of transparency) preferably matches those of the polymeric substrate medium.

Thickness of each substrate (also the upper layer or upper substrate) is in the range of 0.05 mm to 6.35 mm (2 mils to 0.25 inches) in the preferred embodiments. The total thickness of the minus filter (or comb filter) is determined by the number of threat wavelengths and, hence, number of interleaved minus filters used, the required transparency range of the substrate material, the overall weight of the desired device, and the mechanical strength necessary.

Thin film polymeric pair stacks can be provided from a variety of optically transparent polymeric materials, including those mentioned above for substrates. Particularly useful polymers include polymethyl methacrylate (PMMA), available as methyl methacrylate monomer, 99% purity, from Aldrich Chemical Co., Inc. Milwaukee, Wis., hexamethyl disiloxane monomer $Si_2C_6H_{18}O$ 99% purity (HMDSO), available from Aldrich Chemical Co., Inc. Milwaukee, Wis., and polystyrene having index refraction 1.56–1.60 (Monsanto). These are desirable because they can be readily polymerized from their monomer starting reactants and can be deposited at ambient temperatures by plasma deposition techniques under vacuum conditions with different degrees of crosslinking which influence the refractive indices. In general, increased crosslinking leads to increased refractive index of a polymeric layer deposited by plasma polymerization. In all cases, an interference layer with index of refraction $n_2$ is deposited at a lower radiofrequency (RF) power density than interference layer with index of refraction $n_1$.

Optical thickness of each pair is equal to $\frac{1}{2}$ of the wavelength at the center of the band to be rejected. Rejected wavelengths are reflected rather than absorbed by the polymeric minus stacks. In general, pair physical thicknesses are in the range of approximately 100 nm to 700 nm over the operational spectral band extending from 300 nm to 2000 nm.

One polymeric member of a pair (i.e., low refractive index member) has a relative physical thickness compared to the other in the range of approximately 1.1/1. The high index layer is slightly thinner than the low refractive index layer.

Minus filters of the invention can be provided as follows:

Slow compression molding and UV laminating can be used to form sheets of at least one stack into visor shapes without optical and mechanical degradation.

In contrast to dye-based filter designs, polymeric nonabsorbing multilayer thin film minus filters can be designed and manufactured to achieve high visual transmission combined with high rejection of laser threat radiation at any specified wavelength from the visible through the near infrared spectral regions. Polymeric minus filters have numerous technical advantages over dye based designs. These include: high potential photopic and scotopic transmittances, nearly square cuton/-cutoff spectral profiles, neutral color perception, wideband operating range, negligible heat generated in filter on exposure to intense laser power and therefore a high potential laser damage resistance, tunability for specific laser threat wavelengths, and amenability to laminated constructions for achieving rejections at multiple wavelengths. Laser rejection at multiple wavelengths is achieved by utilizing a laminated construction with interleaved interference stacks operating in series.

It should also be noted that the polymeric minus filter design concept for threat laser rejection utilizes homogeneous (uniform in structure) thin film structures which, in contrast to "rugate" graded index filter designs, can be manufactured with consistent results by vacuum deposition processes. Also, noteworthy is the fact that absorbing short wave and absorbing long wave (e.g., "hot mirror") filters can be utilized in combination with the multilayer minus filter components in the laminated constructions for achieving additional laser rejection properties without sacrificing visual photopic performance.

Moreover, the plasma polymerization process can be performed at ambient temperature (e.g., 20°–23° C.) for materials such as HMDSO and PMMA.

FIG. 1 shows a minus filter stack 10 having substrate 12 and multiple pairs 14 of interference layers thereon. Each pair 14 contains a low refractive index 13 and a high refractive index 15 interference layer. Low index of refraction layer 13 represents the uppermost layer of the stack. Protective layer (e.g., a cemented upper substrate) 16 overlays the stack.

Figure 2:
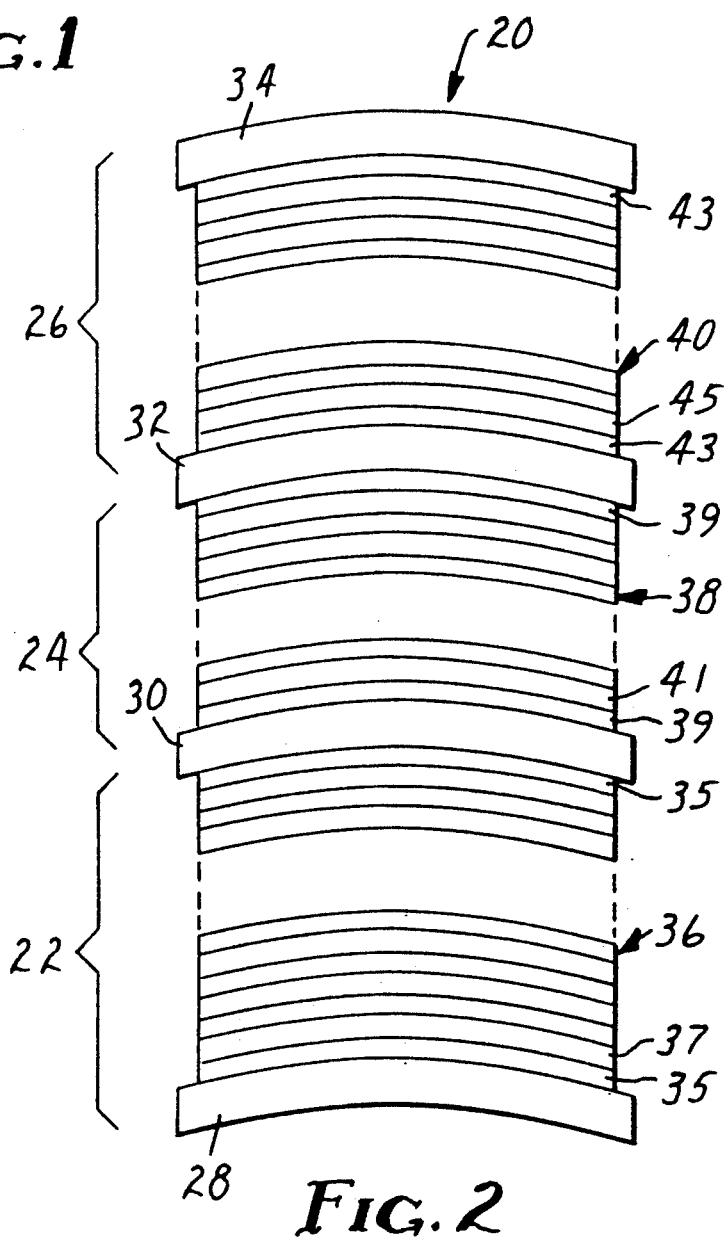
FIG. 2 is a schematic view showing a three-stack minus filter of the invention.

More particularly, FIG. 2 shows a minus filter 20 comprising at least three interference stacks 22, 24, and 26, each tuned to a wavelength $\lambda_0$, $\lambda_1$, and $\lambda_2$ respectively. Pairs of polymeric thin interference layers 36, 38, and 40 having a lower and higher index of refraction member (35, 37), (39, 41) and (43, 45), respectively have total optical thicknesses equal to $\frac{1}{2}$ wavelength of $\lambda_0$, $\lambda_1$, and $\lambda_2$, respectively. Low index of refraction layers 35, 39, and 43, respectively, represent the uppermost members of each stack. Transparent protective layer 34 overlays the layered structure.

Polymeric minus filters of the invention find utility in any sensor protection device where it is desirable to provide a high degree of protection against laser threat radiation.

Objects and advantages of this invention are further illustrated by the following examples, but the particular materials and amounts thereof recited in these examples, as well as other conditions and details, should not be construed to unduly limit the invention.

Computer-generated examples are of two sets, designated Examples 1 and 2, containing 13 and 14 entries. The two sets differ in the refractive index of the substrate (and therefore the refractive index of one of each of the two layers of the quarter-wave pairs). The variable for each data entry is the refractive index of the second of the two quarter-wave layer pairs. The tables then indicate the number of layer pairs (for the given set of indices of refraction) required to achieve a designated optical density at the threat wavelength of light.

Also indicated for each data entry is the percent bandwidth of the stack, i.e., the width of reflection band divided by the (center) wavelength of the band, expressed as a percent. As the difference between the two indices of refraction become smaller, the rejection band becomes narrower, thereby increasing the amount of out of band light that can be transmitted through the layers.

The optical thickness of each quarter-wavelength layer is determined by the (center) wavelength of interest.

Examples of computer generated minus filter designs (TABLES 1 and 2, below) for polycarbonate substrates give the number of layers and the percent full bandwidths of rejection (Delta $Lambda_o$ of reflectance zone/$Lambda_o$) * 100) for achieving optical densities in the range from 3–6 for minus filters stacks having polycarbonate substrates for a range of low index plasma polymer films from 1.45–1.57.

A design illustrative of the invention consists of an organic film stack immersed in incident medium of polycarbonate (PC) (with N=1.58–1.59): PC/[M1](L H)$^\eta$L [M2]/PC where 'L' denotes a quarter wave optical thickness low index film ($n_2$) and 'H' denotes a quarter wave high index film ($n_1 \approx n$ substrate) and '$\eta$' denotes number of repeated pairs of quarter-wave (Q-W) optical thickness layers in minus filter stack and [M1] and [M2] denote optional stacks of organic matching layers designed to minimize ripple in visual transmitted pass-bands as disclosed in Thelen and Macleod, supra.

TABLE 1 refractive index of polycarbonate substrate = 1.58 = refractive index of film $n_1$ (e.g., polystyrene or HMDSO)

| OPTICAL DENSITY | NUMBER OF Q-W LAYERS IN STACK WITH FILM INDICES $n_1$ & $n_2$ |
|---|---|
| | Refractive index of film $n_2$ = 1.45 |
| | % bandwidth of stack = 5.46 |
| 3 | 95 |
| 4 | 123 |
| 5 | 149 |
| 6 | 177 |
| | Refractive index of film $n_2$ = 1.46 |
| | % Bandwidth of stack = 5.03 |
| 3 | 103 |
| 4 | 133 |
| 5 | 163 |
| 6 | 191 |
| | Refractive index of film $n_2$ = 1.47 |
| | % Bandwidth of stack = 4.59 |
| 3 | 113 |
| 4 | 145 |
| 5 | 177 |
| 6 | 209 |
| | Refractive index of film $n_2$ = 1.48 |
| | % Bandwidth of stack = 4.16 |
| 3 | 125 |
| 4 | 161 |
| 5 | 197 |
| 6 | 231 |
| | Refractive index of film $n_2$ = 1.49 |
| | % Bandwidth of stack = 3.73 |
| 3 | 141 |
| 4 | 179 |
| 5 | 219 |
| 6 | 259 |
| | Refractive index of film $n_2$ = 1.5 |
| | % Bandwidth of stack = 3.31 |
| 3 | 159 |
| 4 | 203 |
| 5 | 247 |
| 6 | 291 |
| | Refractive index of film $n_2$ = 1.51 |
| | % Bandwidth of stack = 2.88 |
| 3 | 183 |
| 4 | 233 |
| 5 | 283 |
| 6 | 335 |
| | Refractive index of film $n_2$ = 1.52 |
| | % Bandwidth of stack = 2.46 |
| 3 | 213 |
| 4 | 273 |
| 5 | 333 |
| 6 | 391 |
| | Refractive index of film $n_2$ = 1.53 |
| | % Bandwidth of stack = 2.05 |
| 3 | 257 |
| 4 | 329 |
| 5 | 401 |
| 6 | 471 |
| | Refractive index of film $n_2$ = 1.54 |
| | % Bandwidth of stack = 1.63 |
| 3 | 323 |
| 4 | 413 |
| 5 | 503 |
| 6 | 591 |
| | Refractive index of film $n_2$ = 1.55 |
| | % Bandwidth of stack = 1.22 |
| 3 | 431 |
| 4 | 551 |
| 5 | 671 |
| 6 | 793 |
| | Refractive index of film $n_2$ = 1.56 |
| | % Bandwidth of stack = .81 |

TABLE 1-continued refractive index of polycarbonate substrate = 1.58 = refractive index of film $n_1$ (e.g., polystyrene or HMDSO)

| OPTICAL DENSITY | NUMBER OF Q-W LAYERS IN STACK WITH FILM INDICES $n_1$ & $n_2$ |
|---|---|
| 3 | 651 |
| 4 | 831 |
| 5 | 1011 |
| 6 | 1193 |
| | Refractive index of film $n_2$ = 1.57 |
| | % Bandwidth of stack = .40 |
| 3 | 1305 |
| 4 | 1667 |
| 5 | 2031 |
| 6 | 2393 |

TABLE 2

Refractive index of polycarbonate substrate = 1.59 = Refractive index of film $n_1$ (e.g., polystyrene or HMDSO)

| OPTICAL DENSITY | NUMBER OF Q-W LAYERS IN STACK WITH FILM INDICES $n_1$ & $n_2$ |
|---|---|
| | Refractive index of film $n_2$ = 1.45 |
| | % Bandwidth of stack = 5.86 |
| 3 | 89 |
| 4 | 113 |
| 5 | 139 |
| 6 | 163 |
| | Refractive index of film $n_2$ = 1.46 |
| | % Bandwidth of stack = 5.43 |
| 3 | 97 |
| 4 | 123 |
| 5 | 151 |
| 6 | 177 |
| | Refractive index of film $n_2$ = 1.47 |
| | % Bandwidth of stack = 4.99 |
| 3 | 105 |
| 4 | 135 |
| 5 | 163 |
| 6 | 193 |
| | Refractive index of film $n_2$ = 1.48 |
| | % Bandwidth of stack = 4.56 |
| 3 | 115 |
| 4 | 147 |
| 5 | 179 |
| 6 | 211 |
| | Refractive index of film $n_2$ = 1.49 |
| | % Bandwidth of stack = 4.13 |
| 3 | 127 |
| 4 | 163 |
| 5 | 197 |
| 6 | 233 |
| | Refractive index of film $n_2$ = 1.5 |
| | % Bandwidth of stack = 3.71 |
| 3 | 141 |
| 4 | 181 |
| 5 | 221 |
| 6 | 259 |
| | Refractive index of film $n_2$ = 1.51 |
| | % Bandwidth of stack = 3.29 |
| 3 | 159 |
| 4 | 205 |
| 5 | 285 |
| 6 | 293 |
| | Refractive index of film $n_2$ = 1.52 |
| | % Bandwidth of stack = 2.87 |
| 3 | 183 |
| 4 | 235 |
| 5 | 285 |
| 6 | 337 |
| | Refractive index of film $n_2$ = 1.53 |
| | % Bandwidth of stack = 2.45 |
| 3 | 215 |
| 4 | 275 |
| 5 | 335 |
| 6 | 395 |
| | Refractive index of film $n_2$ = 1.54 |
| | % Bandwidth of stack = 2.03 |

TABLE 2-continued

Refractive index of polycarbonate substrate = 1.59 =
Refractive index of film $n_1$ (e.g., polystyrene or HMDSO)

| OPTICAL DENSITY | NUMBER OF Q-W LAYERS IN STACK WITH FILM INDICES $n_1$ & $n_2$ |
|---|---|
| 3 | 259 |
| 4 | 331 |
| 5 | 403 |
| 6 | 475 |
| Refractive index of film $n_2$ = 1.55 | |
| % Bandwidth of stack = 1.62 | |
| 3 | 325 |
| 4 | 415 |
| 5 | 505 |
| 6 | 595 |
| Refractive index of film $n_2$ = 1.56 | |
| % Bandwidth of stack = 1.21 | |
| 3 | 435 |
| 4 | 555 |
| 5 | 677 |
| 6 | 797 |
| Refractive index of film $n_2$ = 1.57 | |
| % Bandwidth of stack = .81 | |
| 3 | 655 |
| 4 | 837 |
| 5 | 1019 |
| 6 | 1199 |
| Refractive index of film $n_2$ = 1.58 | |
| % Bandwidth of stack = .40 | |
| 3. | 1313 |
| 4 | 1679 |
| 5 | 2043 |
| 6 | 2409 |

EXAMPLE 3

Figure 3:
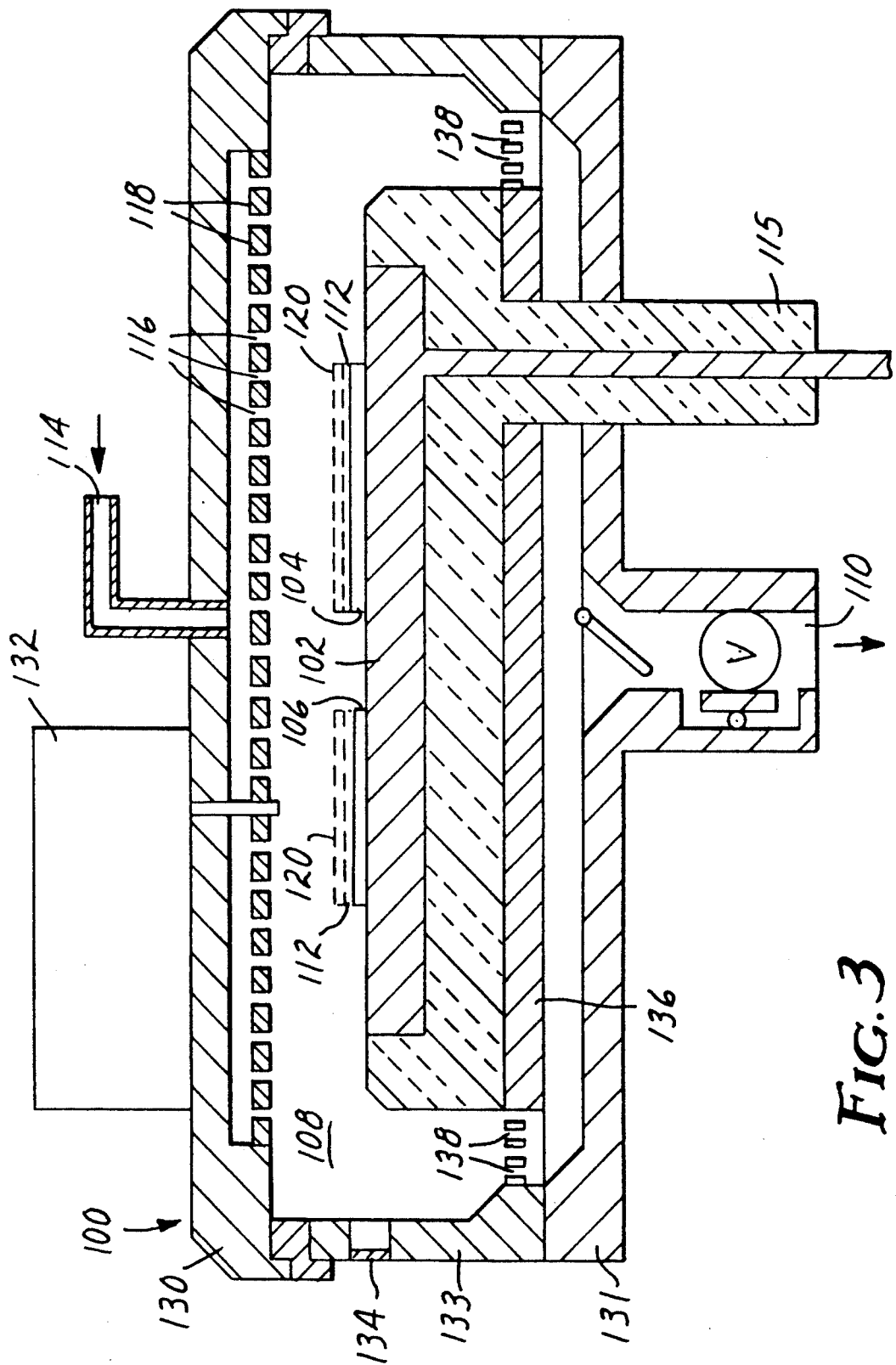
FIG. 3 shows a schematic diagram of a plasma deposition reactor.

A polycarbonate substrate 104 having a thickness of 254 micrometers was placed on substrate electrode 102 of a Plasma Deposition Reactor 100 (Plasma Therm Co., model no. PK2440) schematically illustrated in FIG. 3. Plasma Deposition Reactor 100 also comprises top housing 130, bottom housing 131, side housing 133, insulator 115, optical monitor 132, view port 134, insulator 136, and openings 138. The power supply is not shown. Witness glass 106 was positioned immediately adjacent to polymeric substrate 104. Chamber 108 was then evacuated through exit port 110 to a pressure in the range of 20 to 30 mTorr. or deposition of low index layer 112, process gases (hexamethyldisiloxane (HMDSO) and oxygen) were admitted through inlet port 114 in controlled amounts by varying the input flow rate of the gases which disperse through openings 116 in shower head electrode 118. The evacuation from the chamber 108 by/into a turbomolecular vacuum pump (not shown) connected to exit port 110 was continued until the pressure in the chamber reached 20 mTorr. At ignition of a plasma at 13.56 MHz inside chamber 108, the pressure increased to 25 mTorr.

For deposition of a high index layer 120, the process gas (HMDSO) was admitted through inlet port 114 in controlled amounts by varying the input flow rate of the gas and the evacuation rate from chamber 108 by/into the turbomolecular vacuum pump (not shown) until the pressure in the chamber reached 30 mTorr. At ignition of the plasma, pressure increased to 35 mTorr.

The parameters of deposition of the low index layer 112 (plasma polymerized hexamethyldisiloxane) were as follows:
Gas Flow:
  50 sccm HMDSO
  80 sccm oxygen
Pressure: 25 mTorr (20 mTorr to 25 mTorr step-up at plasma ignition)
RF Power: −400 Volts RF Control Mode; (−155 Watts)
Film Properties:
  1.460 Index of Refraction
  1.5 nm/second Deposition Rate The parameters of deposition of the high index layer 120 (also plasma polymerized hexamethyldisiloxane) were as follows:
Gas Flow: 32 sccm HMDSO
Pressure: 35 mTorr (30 mTorr to 35 mTorr step-up at plasma ignition)
RF Power: −530 Volts RF Control Mode; (−250 Watts)
Film Properties:
  1.55 Index of Refraction 4.5 nm/second Deposition Rate Depositions in accordance with the above process parameters were alternated 121 times, starting with the low index layer, then the high index, then low index, etc., ending with the final low index film to provide 60 pairs +1. The optical thicknesses for each layer were monitored insitu in the deposition chamber using optical monitor 132 comprising a modulated beam photometer coupled to a diffraction grating monochromator for wavelength control. Depositions of the high and low index quarter-wave layers were terminated at reflectance extrema sampled on a silicon wafer witness glass 106 as measured by above mentioned optical monitor 132. For example, the deposition of the first low index layer was terminated when the reflectance variation during the deposition reached the first minimum point, as is known in the art (optical thickness of the layer was equal to ¼ wave at the monitoring wavelength); the deposition of the first high index film (deposited on the first ¼ wave index film) was terminated when the reflectance variation during the deposition reached a maximum value, as is known in the art (optical thickness of the layer was equal to ¼ wave at the monitoring wavelength). Spectral performance of this 121 layer minus filter is shown in FIG. 4 for the wavelength region from 0.3 to 0.9 micrometers, with the ordinate scale given in terms of absorbance (optical density) units from 0 to 3. As shown, the peak optical density A of the filter as measured at the rejection wavelength (the wavelength was 0.55 micrometer) was equal to 2.55 for the composite minus filter composed of 121 alternating high and low index layers of HMDSO polymeric material. "A" represents the maximum optical density (2.55) achieved at the designated wavelength of $\lambda_0=0.55$ micrometer. (An optical density=2.55 is equivalent to a transmittance of 0.28% and equivalent to a reflectance of 99.72% for non-adsorbing film materials.)

A protective upper substrate of polycarbonate having a thickness about the same as the lower substrate can be adhered by means of a transparent optical cement to the uppermost thin interference layer.

Various modifications and alterations of this invention will become apparent to those skilled in the art without departing from the scope and spirit of this invention, and it should be understood that this invention is not to be unduly limited to the illustrative embodiments set forth herein.

We claim:

1. A polymeric minus filter for an incident electromagnetic spectral band comprising at least one polymeric interference stack tuned to a predetermined design wavelength centered around $\lambda_0$, wherein $\lambda_0$ is in the range of 300 nm to 2000 nm, said filter comprising an optically transparent substrate and having deposited thereon a multiplicity of pairs of polymeric thin interference layers plus one final polymeric thin interference layer having index of refraction $n_2$, each pair of interference layers having a total optical thickness equal to $\frac{1}{2}$ wavelength of $\lambda_0$, the members of each pair having refractive indices $n_1$ and $n_2$, respectively, wherein the layer having refractive index $n_2$ is directly superimposed upon said substrate having refractive index $n_s$ and wherein $n_s$ is approximately equal to $n_1$, and wherein $n_2$ is less than $n_1$.

2. The minus filter according to claim 1 wherein said substrate is transparent.

3. The minus filter according to claim 1 wherein said substrate is partially absorbing.

4. The filter according to claim 1 wherein said substrate is selected from the group consisting of polycarbonate, polystyrene, polyacrylate, polyaryl sulfone, polyester, and polysulfone.

5. The filter according to claim 4 wherein said substrate is polycarbonate or polystyrene.

6. The filter according to claim 1 wherein said polymeric thin interference layer having refractive index $n_1$, is selected from the group consisting of plasma polymerized polystyrene, hexamethyl disiloxane, and polymethyl methacrylate.

7. The filter according to claim 1 wherein said polymeric thin interference layer having refractive index $n_2$ is selected from the group consisting of plasma polymerized polymethyl methacrylate, polystyrene, and hexamethyl disiloxane.

8. The filter according to claim 1 having a number of interleaved polymeric stacks equal to the number of rejection bands of wavelengths.

9. The filter according to claim 8 wherein each of said stacks has in the range of 25 to 2500 pairs of interference layers.

10. The filter according to claim 1 wherein said substrate is polycarbonate, said interference layer having index of refraction $n_1$ is plasma polymerized hexamethyl disiloxane, and said interference layer having index of refraction $n_2$ is polymethyl methacrylate or plasma polymerized hexamethyl disiloxane.

11. The filter according to claim 1 wherein $\lambda_0$ is a wavelength in the visible range.

12. The filter according to claim 1 wherein $\lambda_0$ is a wavelength in the near infrared range.

13. The filter according to claim 1 wherein said substrate is polycarbonate.

14. The filter according to claim 1 wherein said interference layer having index of refraction $n_2$ is plasma polymerized hexamethyl disiloxane.

15. The filter according to claim 1 wherein said interference layer having index of refraction $n_1$ is polymerized hexamethyl disiloxane.

16. The film according to claim 10 wherein said interference layers are deposited on said substrate at ambient temperatures.

17. A method for preparing a minus filter comprising a stack of organic layers for rejecting an incident electromagnetic spectral band comprising the step of
depositing on an optically transparent substrate having refractive index $n_s$ a multiplicity of pairs of plasma polymerized organic interference layers having refractive indices $n_1$ and $n_2$, $n_2$ being lower than $n_1$, wherein a layer having refractive index $n_2$ is directly superimposed upon the substrate, and $n_s$ is approximately equal to $n_1$, and depositing a final plasma polymerized organic layer having refractive index $n_2$, said layers and substrate providing a polymeric interference stack which is tuned to a predetermined design wavelength centered around $\lambda_0$, wherein $\lambda_0$ is in the range of 300 nm to 2000 nm.

18. A method for rejecting multiple bands of incident electromagnetic radiation comprising a composite of multistacks, each of said stacks being prepared by the method according to claim 17.

19. A method of protecting a radiation sensitive object from at least one selected wavelength of unwanted electromagnetic radiation comprising the step of:
providing the minus filter according to claim 1 which is positioned so as to prevent said selected wavelength of electromagnetic radiation from reaching said object to be protected.

20. The polymeric minus filter according to claim 1 wherein said polymeric thin interference layers are vacuum deposited by plasma polymerization.

* * * * *

UNITED STATES PATENT AND TRADEMARK OFFICE
CERTIFICATE OF CORRECTION

PATENT NO. : 5,238,738
DATED : August 24, 1993
INVENTOR(S) : Robert H. Miller

It is certified that error appears in the above-indentified patent and that said Letters Patent is hereby corrected as shown below:

Column 2, line 22, "ns" should be --$n_s$--.
Column 4, line 32, "wellestablished" should be --well established--.
Column 9, line 45, "or" should be --For--.
Col. 10, line 3, "-155" should be -- ~155 --.
Col. 10, line 14, "-250" should be -- ~250 --.

Signed and Sealed this

Tenth Day of May, 1994

BRUCE LEHMAN

*Attest:*

*Attesting Officer*     *Commissioner of Patents and Trademarks*